Figure 1:
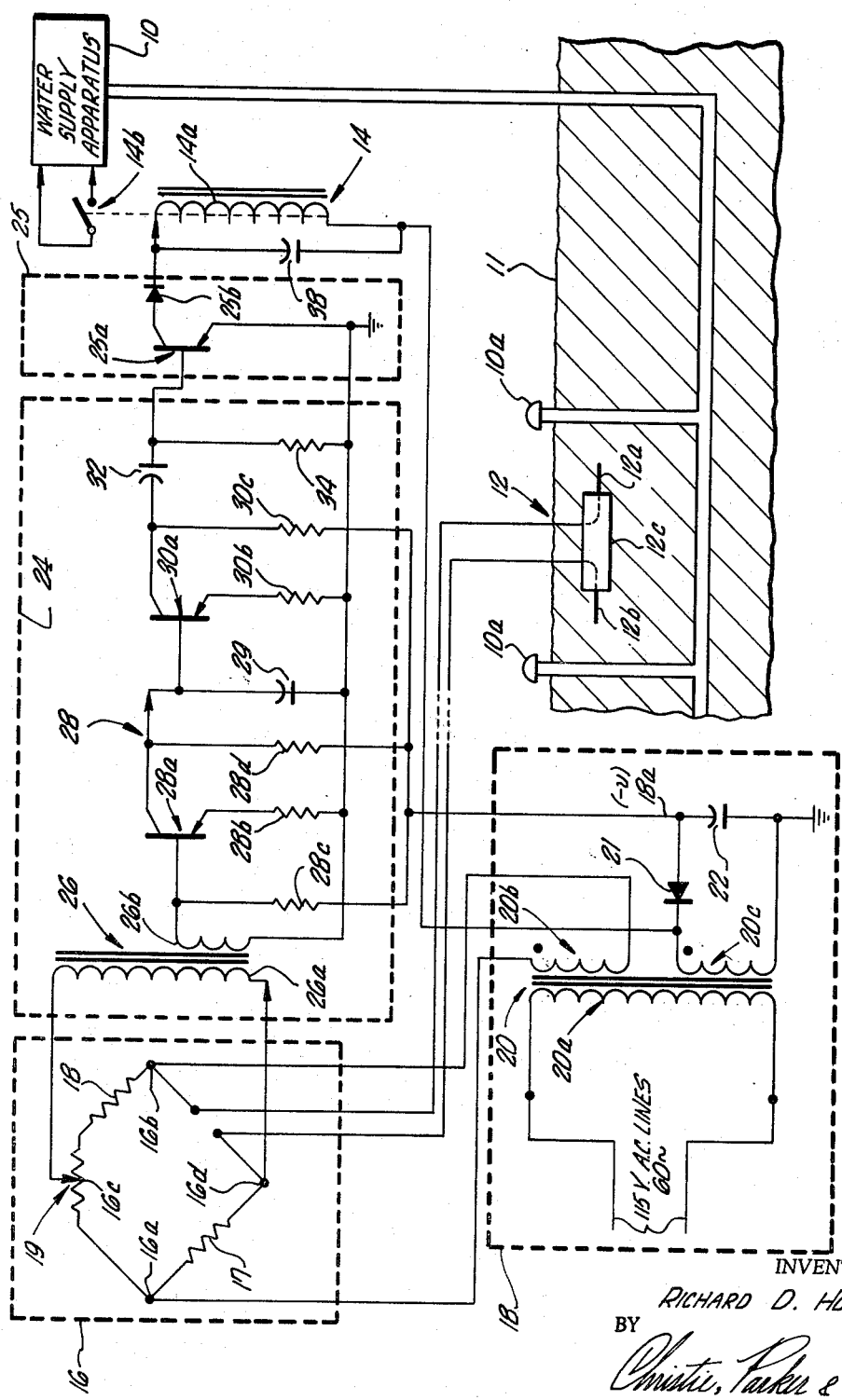

INVENTOR.
RICHARD D. HOSIER
BY
Christie, Parker & Hale
ATTORNEYS.

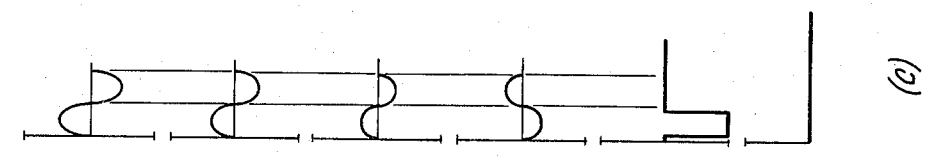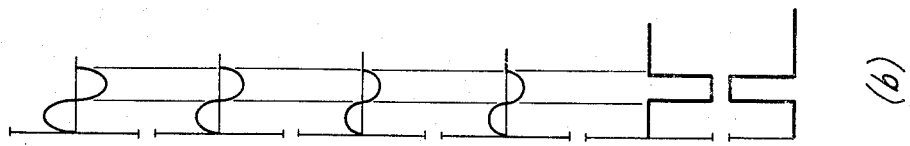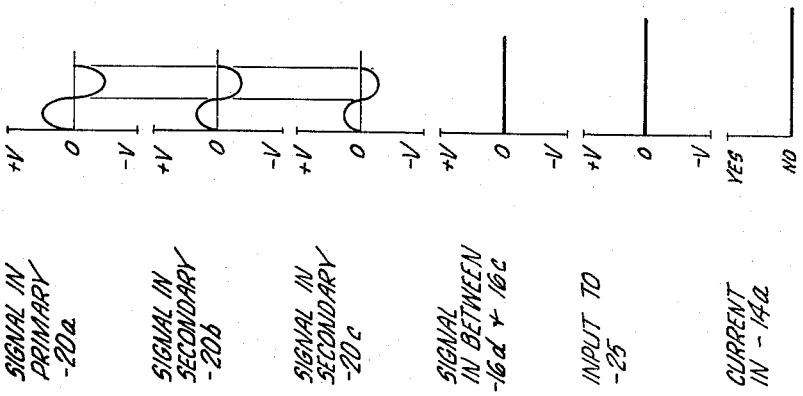

3,182,914
AUTOMATIC WATERING DEVICE
Richard D. Hosier, 7449 Norwood Place,
San Gabriel, Calif.
Filed Aug. 19, 1963, Ser. No. 302,886
4 Claims. (Cl. 239—63)

This invention relates to an improved moisture sensing device and more particularly to an automatic watering system utilizing the improved moisture sensing device for maintaining moisture in the soil at a desired level.

Automatic watering systems are well known which utilize a pair of moisture sensing probes inserted into the soil for sensing moisture in the soil. The moisture content of the soil is continuously sensed. Whenever moisture in the soil drops below a prefixed level, water is automatically applied to the soil. Water is continuously applied to the soil until the moisture content in the soil is raised above a predetermined level at which time the application of water to the soil is terminated.

The amount of moisture in the soil is determined by sensing the amount of electrical resistance in between the two moisture sensing probes inserted into the soil. As the moisture content in the soil increases, the amount of electrical resistance between the probes decreases. In order to measure resistance in the soil, an electrical signal is applied between the probes and the amount of current flowing between the probes is sensed. The amount of current flowing in between the probes provides an indication of the resistance in the soil in between the moisture sensing probes.

Prior art automatic watering systems utilizing moisture sensing probes either apply a direct current electrical signal or a non-symmetrical alternating current signal across the moisture sensing probes. It has been found that such prior art systems are subject to the serious disadvantage that the moisture sensing probes decompose. The decomposition of the probes is caused by the chemical action of electrolysis. Electrolysis causes the probes to decompose causing the sensitivity of the moisture sensing system to deteriorate to the point where the moisture probes must be replaced. It has been found that the moisture probes must be replaced quite often due to deterioration.

This disadvantage is overcome in an automatic watering system embodying the present invention wherein it has been found that virtually no decomposition of the moisture sensing probes can be detected.

Briefly a specific embodiment of the present invention is directed to a device for sensing moisture in a substance the combination which comprises, a pair of metallic moisture sensing probes adapted for insertion adjacent to each other into a substance, the moisture content of which is to be sensed, such that the resistance between the probes is indicative of the moisture content of the substance; means for applying an electrical signal across said probes having a charge-flow characteristic which periodically reverses and the average value of which is substantially zero for essentially eliminating the decomposition of the probes due to electrolysis; and an electrical circuit connected to be responsive to a predetermined current flowing in between the probes due to said electrical signal for forming a unique signal indicative thereof.

These and other advantages of the present invention may be more fully understood with reference to the following description of the figures of which:

FIG. 1 is a schematic and block diagram of a preferred embodiment of the present invention; and FIG. 2 is a wave-shape diagram illustrating the wave forms at the designated points in the schematic diagram of FIG. 1, according to the type of moisture condition in the soil.

Refer now to the schematic and block diagram of an automatic watering system shown in FIG. 1 and which embodies the present invention. The automatic watering system includes a controllable water supply apparatus 10. The controllable water supply apparatus 10 includes piping to which are connected sprinkler heads 10a for watering surrounding soil 11. The controllable water supply apparatus is responsive to the closure of contacts 14b of a relay 14 for supplying water through the pipe to the sprinkler heads 10a. When the contacts 14b are opened the controllable water supply apparatus terminates the supply of water to the sprinkler heads 10a.

A moisture sensing probe apparatus 12 is provided for sensing the moisture content in the soil. The apparatus 12 includes a pair of stainless steel moisture sensing probes 12a and 12b which are connected into an insulating member 12c such that they extend out in opposite directions as shown in FIG. 1. In a preferred embodiment of the present invention, the moisture probes 12a and 12b are made of 300 series stainless steel rod.

The moisture sensing probes 12a and 12b are coupled to a resistive bridge circuit 16. The resistive bridge circuit 16 has two pairs of terminals 16a, 16b and 16c, 16d. The moisture sensing probes 12a and 12b are coupled in between the terminals 16b and 16d. The resistive bridge circuit 16 has a resistor 17 connected in between the terminals 16a and 16d. A potentiometer 19 has a resistive element with one end thereof connected to the terminal 16a. The other terminal of the resistive element of the potentiometer 19 is serially connected to the terminal 16b through a resistor 18. The potentiometer 19 has a sliding contact 19a which is also the terminal 16c of the resistive bridge circuit 16.

Means is provided for applying an electrical signal across the terminals 16a and 16b of the resistive bridge circuit 16. This means is shown generally at 18 in FIG. 1. Included in the means 18 is a transformer 20. The transformer 20 has a primary winding 20a coupled across a pair of 115 volt 60 cycle power lines such as those commonly used to supply electrical power for home use. The transformer 20 also includes first and secondary windings 20b and 20c.

A rectifier diode 21 and a capacitor 22 are serially connected together in between the terminals of the secondary winding 20c of the transformer 20. The cathode electrode of the diode 21 is connected to one terminal of the transformer secondary winding 20c and its anode electrode is connected to one plate of the transformer 20. The junction of the diode 21 and capacitor 22 are connected to the line 18a. The alternating current signal formed in the secondary winding 20c is rectified by the diode 21 and capacitor 22 to form a direct current signal on the line 18a which is negative with respect to the potential at the opposite side of capacitor 22. The opposite side of the capacitor 22 from the line 18a is connected to ground (zero volts potential).

The secondary winding 20b is connected across the terminals 16a and 16b of the resistive bridge circuit 16. The secondary windings 20b and 20c are poled such that the signals at the end of the windings designated by a dot, with respect to the potential at the opposite side of the secondary windings, are in phase.

Means is provided in the automatic watering system of FIG. 1 for forming a unique signal for use in controlling the controllable water supply apparatus 10 for causing it to supply water to the sprinkler heads 10a. This means includes the bridge 16, a phase detector and amplifier circuit 24, a switching circuit 25 and the relay 14.

Consider first the phase detector and amplifier 24. The phase detector and amplifier 24 includes an isolation transformer 26. The isolation transformer 26 has a primary winding 26a connected across the terminals 16c and 16d of the resistive bridge circuit 16. The isolation transformer 26 also has a secondary winding connected to the input circuit of a detector circuit 28.

The detector circuit 28 includes a transistor 28a, an emitter load resistor 28b, a biasing resistor 28c and a load resistor 28d. The transistor 28a is a PNP type type transistor having its emitter electrode connected through the emitter resistor 28b to ground. The collector electrode of the transistor 28 is serially connected through the load resistor 28d to the power supply line 18a. The base electrode of the transistor 28a is serially connected through the secondary winding 26b to ground potential and is also serially connected through the bias resistor 28c to the power supply line 18a.

A capacitor 29 is connected in between the collector electrode of the transistor 28a and ground. The capacitor 29 is a filter capacitor and filters out high frequency oscillations in the detector and amplifier circuit 24.

An amplifier circuit 30 is also provided in the detector and amplifier circuit 24. The amplifier 30 includes a PNP type transistor 30a, an emitter load resistor 30b and a load resistor 30c. The transistor 30a has its base electrode connected to the collector electrode of the transistor 28. The emitter electrode of the transistor 30a is serially connected through the emitter load resistor 30b to ground. The collector electrode of the transistor 30a is serially connected through the load resistor 30c to the power supply line 18a.

A coupling capacitor 32 and a load resistor 34 are serially connected between the collector electrode of the transistor 30a and ground. One end of the resistor 34 is connected to ground potential whereas one side of the capacitor 32 is connected to the collector electrode of the transistor 30. The junction of the capacitor 32 and the resistor 34 is connected to the input circuit of the switching circuit 25. The capacitor 32 and the resistor 34 form a filter circuit which allows 60 cycle signals to pass therethrough to the input of the switching circuit 25. Thus the capacitor 32 blocks out D.C. signals formed at the collector electrode of the transistor 30, from the switching circuit 25.

Refer now to the switching circuit 25. The switching circuit 25 includes a PNP type transistor 25a and a rectifier diode 25b. The base electrode of the transistor 25a is connected to the junction of the capacitor 32 and the resistor 34. The collector electrode of the transistor 25a is serially connected through the rectifier diode 25b to one end of the coil 14a of the relay 14. The rectifier diode 25b is poled with its anode electrode connected to the transistor 25a. The emitter electrode of transistor 25a is connected to ground.

The coil 14a of the relay 14 has one end thereof connected to the coil 20c, as shown, and the other end connected to the cathode electrode of the rectifier diode 25b. A filter capacitor 38 is connected across the coil 14a of the relay 14. The capacitor 38 filters the signal applied thereto causing a direct current signal across the relay coil and absorbs the inductive spikes formed by the coil 14a. The relay 14 is characterized whereby current flowing through the coil 14a causes the contact 14b to be closed whereas the lack of current flowing through the coil 14a causes the contact 14b to be opened.

*Operation*

FIG. 2 shows the wave shape diagrams at the following points in the circuit of FIG. 1: primary winding 20a, secondary winding 20b, secondary winding 20c, signal in between the terminals 16d and 16c, input to switching circuit 25 and current through the coil 14a, of the relay 14.

The wave forms in column (a) of FIG. 2 illustrate the wave forms of the signals at the designated places in the circuit of FIG. 1 when the moisture content of the soil is exactly right or at the desired moisture level. The wave forms in columns (b) and (c) illustrate the wave forms of the signals at the designated places in the circuit of FIG. 1 when the moisture content in the soil is too dry and too wet respectively. The wave forms of FIG. 2 should be referred to in the following discussion for a better understanding of the circuit operation.

Assume now that the automatic watering system shown in FIG. 1 has power applied thereto via the 115 volt power lines and is in an operating condition. Assume initially that exactly the desired moisture content is in the soil 11. The slider on the potentiometer 19 is adjusted such that the output signal between the terminals 16c and 16d is zero volts. Under this condition the ratio of the resistance between the terminals 16b and 16d (due to the resistance in the soil due to moisture between the probes 12a and 12b) to the total resistance between the terminals 16b and 16d plus the resistance of 17 is equal to the ratio of the resistance between the terminals 16b and 16c to the total resistance between the terminals 16b and 16c plus the resistance between the terminals 16c and 16a. The resistor 28c is selected such that it biases the transistor 28a into a conductive condition causing the transistor 30a to be biased into a conductive condition. However, the D.C. signal on the collector electrode of the transistor 30a is blocked from the base electrode of the transistor 25a by the capacitor 32. The transistor 25a is biased into a nonconductive condition by the resistor 34. Thus one end of the coil 14a is effectively connected to an open circuit (the collector to emitter electrode circuit of transistor 25a) and the signal in the coil 20c has no effect on the relay 14.

Assume now that the moisture content in the soil 11 drops to a level which is too dry and at which it is desired to add more water to the soil. The resistance between the terminals 16b and 16d increases due to the deficiency of water in the soil 11 between the probes 12a and 12b. The increase of resistance between the terminals 16b and 16d is such as to cause an alternating current signal in between the terminals 16c and 16d of the same general wave shape as that formed in the secondary winding 20b (see column b of FIG. 2. The biasing resistor 28c and emitter biasing register 28b are arranged so that the signal formed in the secondary winding 26b under these conditions, is sufficient to cause the positive excursions of signal in the secondary winding 26b to switch the transistor 28a into a nonconductive condition. Also the negative excursions of signal have sufficient amplitude to switch the transistor 28a into a conductive condition. Each time the transistor 28a is switched into a conductive condition the transistor 30a is switched into a conductive condition, the current applied through the emitter collector electrode circuit of the transistor 30 is coupled to the base electrode of the transistor 25a by the coupling capacitor 32, therefore each time the transistor 28a is switched into a conductive condition, the transistor 25a is switched into a conductive condition.

The phase relationship of the signal formed in between the terminals 16c and 16d to the signal formed in the secondary winding 20c is important and should be noted. When the moisture content of the soil 11 drops and the resistance between the terminals 16b and 16d increases due to the increased resistance between the moisture sensing probes 12a and 12b, the phase of the signal between the terminals 16c and 16d is in phase with the signal formed in the secondary winding 20c. This condition is indicated in curves b of FIG. 2. Under these conditions the signal applied to the coil 14a of the relay 14 by the secondary winding 20c goes negative at exactly the same time that the transistor 25a is switched into a conductive condition. This allows current to flow through the coil 14a of the relay 14 causing the contacts 14b to be closed. As a result, the controllable water supply apparatus 10 is energized and applies water to the sprinkler heads 10a. The relay 14 is a direct current relay, therefore the pulses of current provided by the circuit cause the relay 14 to remain in an energized condition with contacts 14b closed.

When the desired moisture has again built up in the soil 11 the signal in between the terminals 16c and 16d again drops to zero, as indicated in curve (a) of FIG. 2. Again the current through the coil 14a of the relay 14 drops to zero and the contacts 14b are opened causing the controllable water supply apparatus 10 to terminate the supply of water to the sprinkler heads 10a.

Since the moisture is being applied to the top of the soil 11, the moisture gradually sinks down in the soil toward the moisture probes 12a and 12b. Therefore there is a certain time lapse in between the application of moisture to the soil and the time at which the moisture reaches the moisture sensing probes 12a and 12b. As a result, the controllable water supply apparatus will be shut off, however, a short time later the moisture in the soil 11 surrounding the moisture probes, 12a and 12b will rise above the desired moisture content of the soil. Under these conditions the moisture content of the soil is said to be too wet.

When the moisture of the soil 11 is too wet, the resistance between the moisture sensing probes 12a and 12b drops causing the resistance between the terminals 12a and 12b to drop. This causes a lesser amount of resistance to be formed in between the terminals 16b and 16d than in between the terminals 16b and 16c. Under these conditions, the signal in between the terminals 16c and 16d is reversed in phase with respect to the signal formed in the secondary winding 20c. Under these conditions each time the transistor 25a is switched into a conductive condition, the signal applied to the coil 14a of the relay 14 is positive with respect to ground. As a result the signal in coil 20c reverse biases the rectifier diode 25c each time the transistor 25a is biased into a conductive condition, and inhibits current flow through the coil 14a of the relay 14. Therefore the relay 14 is not energized, the contacts 14b remain open, and the controllable water supply apparatus 10 is not energized and does not apply A number of important features of the system shown in FIG. 1 should be noted. First of all, the signal applied across the two terminals 16a and 16b is purely sinusoidal. The bridge 16 couples this same signal (reduced in amplitude) across the probes 12a and 12b, therefore the signal applied across the moisture sensing probes 12a and 12b is also sinusoidal. As a result, the charge flow in between the probes in one direction during one half of the sinusoidal wave is balanced out by an equal and opposite charge flow in the opposite direction during the second half of the sinusoidal wave. As a result, the average value of charge flow in between the moisture sensing probes 12a and 12b is zero. This is extremely important. According to Faraday's law of electrolysis, the amount of chemical decomposition produced by current in between two metal electrodes, that is the amount of substance deposited from one electrode or dissolved on the other electrode, is proportional to the charge of electricity passed in between the electrodes. Therefore, if the charge flow in between the probes in one direction is balanced off by an equal charge flow in the opposite direction, the decomposition of the electrodes due to electrolysis is essentially zero. It becomes quite evident then that the arrangement of the automatic watering system of FIG. 1 is quite important in that it allows a purely sinusoidal wave to be applied across the moisture sensing probes and utilizes a special circuit in combination therewith for sensing when the moisture content of the soil drops to the point where additional moisture is needed in the soil.

It should also be noted that the resistance in between the terminals 16b and 16c and the resistance in between the terminals 16c and 16a cause a reference signal to be formed at the terminal 16c. Since only the resistance between the terminal 16b and 16d changes (due to the change in moisture content in the soil 11) the difference in signal in between the terminal 16c and 16d forms an indication of the impedance or resistance in the soil. The detector amplifier circuit 24 and switching circuit 25 are responsive to the difference in signal between the terminals 16c and 16d, when the moisture content in the soil is too low, for energizing the relay 14 and causing the controllable water supply apparatus 10 to be switched on and supply the sprinkler heads 10a.

What is claimed is:

1. In an automatic watering system: a pair of metallic moisture sensing probes adapted for sensing the moisture content of soil, the resistance between the probes being indicative of the moisture content of the soil, a resistive bridge circuit having one leg connected to said probes and first and second pairs of terminals, control means for said water system adapted to be responsive to the coincidence of two signals in predetermined phase relationship for activating the watering system, means for applying an alternating current signal of predetermined frequency to said control means and to said first pair of terminals, means adapted to apply a second signal to said control means having a phase relationship to the alternating current signal determined by the phase of the input signal thereto, a transformer adapted for coupling the signals formed at said second pair of terminals to the last mentioned means causing such means to apply a signal to said control means in said predetermined phase relationship with the alternating current signal and thereby cause the control means to activate the watering system when the moisture in the soil in between the probes is dry causing a predetermined value of resistance between the probes.

2. In an automatic watering system: a pair of metallic moisture sensing probes adapted for sensing the moisture content of soil, the resistance between the probes being indicative of the mosture content of the soil, a resistive bridge circuit having one leg connected to said probes and first and second pairs of terminals, control means for said water system adapted to be responsive to the coincidence of two signals in predetermined phase relationship for activating the watering system, means for applying a first alternating current signal of predetermined frequency to said control means and including a first transformer having a secondary winding coupled for applying an alternating current signal of said predetermined frequency across said first pair of terminals, switching means adapted to apply a second signal to said control means in response to a control signal applied thereto, means adapted for applying a control signal to said switching means in response to an applied signal of predetermined polarity, a transformer adapted for coupling the signals formed at said second pair of terminals to the last named means causing such means and said switching means to apply a signal to said control means in said predetermined phase relationship with the first signal and thereby cause the control means to activate the watering system when the moisture in the soil in between the probes is dry causing a predetermined value of resistance between the probes.

3. In an automatic watering system: a pair of metallic moisture sensing probes adapted for sensing the moisture content of soil, the resistance between the probes being indicative of the moisture content of the soil, a resistive bridge circuit having one leg connected to said probes and first and second pairs of terminals, control means for activating the operation of said water system and comprising a pair of input terminals, means including a first transformer having a first secondary winding coupled for applying an alternating current signal across said first pair of bridge terminals and a second secondary winding coupled for applying an alternating current signal to one of said control means input terminals, a switching circuit having a control circuit and an output circuit connected to the other side of said control means input terminals from said secondary winding, said switching circuit being adapted to switch into a low impedance condition and thereby cause current to flow therethrough and through said control means in response to a control signal applied at said control circuit in coincidence with a signal of predetermined polarity applied to said output circuit through said control means, means including an amplifier and clipping circuit adapted for applying a control signal to the control circuit of said switching circuit in response to an applied signal of predetermined polarity, a transformer adapted for coupling the signals formed at said second pair of bridge terminals to said amplifier and clipping means causing said amplifier and clipping means to apply a control signal to said switching circuit in coincidence with a signal of predetermined polarity applied to said control means by said secondary winding of the first transformer when the moisture in the soil in between the probes is dry causing a predetermined value of resistance between the probes and thereby cause the control means to activate the operation of the water system.

4. In an automatic watering system: a pair of metallic moisture sensing probes adapted for sensing the moisture content of soil, the resistance between the probes being indicative of the moisture content of the soil, a resistive bridge circuit having one leg connected to said probes and first and second pairs of terminals, control means comprising a relay for activating the operation of the water system, said relay including a control coil, therefore, means including a first transformer having a first secondary winding coupled for applying an alternating current signal of a predetermined frequency across said first pair of terminals and a second secondary winding coupled for applying an alternating current signal of said predetermined frequency to one side of said coil, a switching circuit having a control circuit and an output circuit connected to the other side of said coil from said secondary winding, said switching circuit being adapted to switch into a low impedance condition and thereby cause current to flow therethrough and through said coil in response to a control signal applied at said control circuit in coincidence with a signal of predetermined polarity applied to said output circuit through said relay coil, means including an amplifier and clipping circuit adapted for applying a control signal to the control circuit of said switching circuit in response to an applied signal of predetermined polarity, a transformer adapted for coupling the signals formed at said second pair of terminals to said amplifier and clipping means causing said amplifier and clipping means to apply a control signal to said switching circuit in coincident with such signal of predetermned polarity applied to said coil by said second secondary winding of the first transformer when the moisture in the soil in between the probes is dry causing a predetermined value of resistance between the probes and thereby cause the relay to activate the control means.

References Cited by the Examiner
UNITED STATES PATENTS

| | | | |
|---|---|---|---|
| 2,395,425 | 2/46 | Osborne | 324—30 |
| 2,611,643 | 9/52 | Higgins | 324—65 X |
| 2,636,927 | 4/53 | Durham | 324—65 |
| 2,768,028 | 10/56 | Robinson | 324—65 X |
| 2,812,976 | 11/57 | Haskenkamp | 324—65 X |
| 2,919,672 | 1/60 | Benn et al. | 324—65 X |
| 2,985,827 | 5/61 | Haskenkamp | 324—65 |

EVERETT W. KIRBY, *Primary Examiner.*

UNITED STATES PATENT OFFICE
CERTIFICATE OF CORRECTION

Patent No. 3,182,914                                May 11, 1965

Richard D. Hosier

It is hereby certified that error appears in the above numbered patent requiring correction and that the said Letters Patent should read as corrected below.

Column 3, line 10, strike out "type", second occurrence; column 5, line 41, after "apply" insert -- water to the sprinkler heads 10a. --; column 6, line 37, for "mosture" read -- moisture --.

Signed and sealed this 16th day of November 1965.

(SEAL)
Attest:

ERNEST W. SWIDER
Attesting Officer

EDWARD J. BRENNER
Commissioner of Patents